(12) United States Patent
Qian et al.

(10) Patent No.: US 6,896,809 B2
(45) Date of Patent: May 24, 2005

(54) METHODS FOR PURIFYING CHITOSAN

(75) Inventors: Rui Qing Qian, Portland, OR (US); Robert W. Glanville, Portland, OR (US)

(73) Assignee: Providence Health System - Oregon, Portland, OR (US)

( * ) Notice: Subject to any disclaimer, the term of this patent is extended or adjusted under 35 U.S.C. 154(b) by 161 days.

(21) Appl. No.: 10/326,462

(22) Filed: Dec. 20, 2002

(65) Prior Publication Data

US 2004/0118778 A1 Jun. 24, 2004

(51) Int. Cl.$^7$ ............................................. B01D 11/00
(52) U.S. Cl. ....................... 210/638; 210/639; 210/702; 210/729; 536/20; 536/127; 514/55
(58) Field of Search ................................ 210/634, 638, 210/639, 663, 669, 690, 691, 702, 723–729, 757, 909, 912, 905; 424/422–423; 426/425, 643; 536/20, 127; 514/55

(56) References Cited

U.S. PATENT DOCUMENTS

| | | | |
|---|---|---|---|
| 3,862,122 A | | 1/1975 | Peniston et al. |
| 3,953,608 A | * | 4/1976 | Vanlerberghe et al. ...... 514/777 |
| 4,066,735 A | | 1/1978 | Peniston et al. |
| 4,195,175 A | | 3/1980 | Peniston et al. |
| 4,309,534 A | * | 1/1982 | Austin ........................... 536/20 |
| 5,010,181 A | * | 4/1991 | Coughlin ...................... 536/20 |
| 5,312,908 A | | 5/1994 | Nakao |
| 5,599,916 A | | 2/1997 | Dutkiewicz et al. |
| 5,611,932 A | | 3/1997 | Lee et al. |
| 5,686,115 A | * | 11/1997 | Vournakis et al. ........... 424/488 |
| 5,730,876 A | | 3/1998 | You et al. |
| 5,773,608 A | * | 6/1998 | Yen et al. .................... 536/124 |
| 6,056,970 A | | 5/2000 | Greenawalt et al. |
| 6,310,188 B1 | | 10/2001 | Mukherjee |
| 2003/0045692 A1 | * | 3/2003 | Sannan et al. |

FOREIGN PATENT DOCUMENTS

WO   WO 98/31712   7/1998

OTHER PUBLICATIONS

Qin et al., *Medical Device Technology* 24–27 (1998).
Rinaudo et al., INTAS 96–1193 (Sep. 1, 1997).
Shapiro et al., *Biochemical and Biophysical Research Communications* 28(5):815–820 (1967).
Thongngam, et al., "Characterization of interaction between chitosaen and an anionic surfactant," http:iftconfex.com/ift/2002/techprogram/paper_13867, p. 1 of 1, accessed of Jun. 27, 2002.
Yangling et al., "Interaction of Protein and Cell with Different Chitosan Membranes," http://www.tsinghua.edu.cn/docsn/qbdxxh/myweb/english/99n3/990321.htm, pp. 1–8, accessed Jun. 28, 2002.
No, H., et al., "Preparation of chitin and chitosan," *Chitin Handbook*: 475–489, 1997.

* cited by examiner

*Primary Examiner*—Joseph Drodge
(74) *Attorney, Agent, or Firm*—Klarquist Sparkman, LLP

(57) ABSTRACT

One method for purifying a chitosan starting material includes contacting it with at least one treatment agent selected from a protein-complexing agent, a metal-chelating agent, and a metal-complexing agent under pH conditions effective for forming a water insoluble chitosan precipitate and at least one water soluble material selected from a water soluble protein complex, a water soluble metal chelate, and a water soluble metal complex. Another variant involves solubilizing the chitosan starting material in an aqueous solution to produce an intermediate chitosan material. The intermediate chitosan material is contacted with a deproteinization agent and/or a demetallization agent under pH conditions effective for forming a water insoluble chitosan precipitate and at least one water soluble material that includes the pre-existing impurity. In both methods, the water insoluble chitosan precipitate and the water soluble material are separated resulting in a purified chitosan material.

33 Claims, No Drawings

METHODS FOR PURIFYING CHITOSAN

STATEMENT OF GOVERNMENT SUPPORT

This invention was made with United States Government support under grant number DAMD17-98-1-8654 from the United States Army. The United States Government has certain rights in the invention.

FIELD

The present disclosure relates to methods for purifying chitosan, particularly for obtaining medical grade chitosan suitable for use in biocompatible materials.

BACKGROUND

Chitosan (also referred to as poly-(1→4)-β-D-glucosamine) is a biopolymer with many uses in the pharmaceutical, medical device, food and water treatment industries. For example, chitosan may be used as a delivery vehicle for a therapeutically active agent, in a synthetic bone graft material (e.g., a mixture of chitosan and hydroxyapatite), in spinal fusions, and in various wound healing applications such as hemostatic bandages. Chitosan has become an important hemostatic agent candidate since defibrinated blood, heparinized blood, and washed red cells all can form a coagulum in contact with chitosan. Hemostatic properties of chitosan depend on a novel hemostatic mechanism in addition to the clot formed by activation of fibrinogen and platelets. In addition, the strong tissue adhesive properties of chitosan increase its hemostatic efficacy. Other researchers have used chitosan for hemostasis in animals, for example, for vascular grafts in dogs, lingual hemostasis in rabbits, and topical hemostasis for diffuse capillary bleeding in animal brains. However for clinical hemostasis in humans, an important prerequisite is to reduce the immunological responses induced by the impurities in commercially available chitosan. Chitosan has also been marketed for use in consumer food products or nutritional supplements that are said to reduce fat and cholesterol.

Chitosan and its precursor, chitin, are typically prepared from waste shells of crustaceans, particularly decapod crustaceans such as crab, shrimp, crawfish, krill, lobster, squid and prawn. The conventional process for producing chitin and chitosan from crustacean shells involves grinding crustacean shells and treating the ground shells with a dilute base (e.g., sodium hydroxide) and heat to remove protein and lipids (deproteinization). Calcium carbonate is removed by extraction with a dilute acid (e.g., hydrochloric acid) at room temperature (demineralization). Following deproteinization and demineralization, the resulting product is predominantly chitin. An optional decolorization step may be used to bleach the chitin, for example, extraction with ethanol and ether, or bleaching with sodium hypochlorite. Removal of acetyl groups from the chitin polymer (deacetylation) produces chitosan; deacetylation is usually performed by reacting chitin with concentrated sodium hydroxide or potassium hydroxide and heat. The deacetylation process does not remove any contaminants existing in the chitin starting material. Thus, impurity removal for chitosan only occurs during production of the chitin precursor. Chitosan is not a single, definite chemical entity since it varies in composition depending on the crustacean species used for the starting material and the particular preparation method used.

Reducing or substantially removing impurities from chitosan that can cause immunological reactions is critical for chitosan intended for use as a biocompatible and biodegradable material in medical applications. However, purifying chitosan is very difficult since chitosan in solution is a highly viscous material. Producing highly pure, medical grade chitosan via the above-described conventional techniques is very expensive since such techniques typically require costly instrumentation such as autoclaves, ultrafiltration, and molecular sieves. The availability of less expensive medical grade chitosan should expand and accelerate its use in biomedical applications.

SUMMARY OF THE DISCLOSURE

Disclosed herein are methods for purifying a chitosan starting material (especially food grade chitosan or chitosan powder) that includes at least one pre-existing impurity, particularly protein and/or metal impurities. The disclosed methods reduce the amount of one of more impurity resulting in a more purified chitosan material.

One variant of the method involves contacting a food grade chitosan material or chitosan powder with at least one treatment agent selected from a protein-complexing agent, a metal-chelating agent, and a metal-complexing agent under pH conditions effective for forming a water insoluble chitosan precipitate and at least one water soluble material selected from a water soluble protein complex, a water soluble metal chelate, and a water soluble metal complex. The water insoluble chitosan precipitate and the water soluble material then are separated resulting in a purified chitosan material.

A second variant of the method involves solubilizing the chitosan starting material in an aqueous solution to produce an intermediate chitosan material. The intermediate chitosan material is contacted with at least one treatment agent selected from a deproteinization agent and a demetallization agent under pH conditions effective for forming a water insoluble chitosan precipitate and at least one water soluble material that includes the pre-existing impurity. The water insoluble chitosan precipitate and the water soluble material then are separated resulting in a purified chitosan material.

The disclosed methods will become more apparent from the following detailed description of several embodiments.

DETAILED DESCRIPTION OF SEVERAL EMBODIMENTS

For ease of understanding, the following terms used herein are described below in more detail:

"Protein" is inclusive of one or more proteins and encompasses proteins, polypeptides, peptides, fragments thereof, and conjugated proteins.

"Metal" is inclusive of one or more metals and encompasses metallic salts, metal oxides, metal hydrides, metal ions, and elemental metal. The metal can be any type of metal such as, for example, an alkali metal, an alkaline-earth metal, a transition metal, a rare-earth metal, or mixtures thereof.

The above term descriptions are provided solely to aid the reader, and should not be construed to have a scope less than that understood by a person of ordinary skill in the art or as limiting the scope of the appended claims.

One feature of the methods disclosed herein is that commercially available chitosan having a higher level of impurities can be used as the starting material for further purification. In conventional methods, the impurity level in a particular chitosan product is controlled during production of the chitin precursor. Food grade chitosan is one example of a less-expensive, more-contaminated chitosan that can be used as a starting material. Food grade chitosan is significantly less expensive than commercially available medical grade chitosan. Food grade chitosan includes a level of impurities that is sufficiently low for safe human consumption, but too high for medical use as a biocompatible material. Typically, a food grade chitosan material will have a protein impurity level of less than about 1.2 weight percent, more particularly about 0.4 to about 0.8 weight percent, and a metal impurity level of about 70 to about 80 ppm (with a heavy metal content of less than about 7.5 ppm), and will include pigment. The chitosan starting material can be in any physical form such as a powder or a mixture of small fibers and particles.

Another feature of the disclosed methods is their cost effectiveness. The disclosed methods typically utilize less expensive centrifuge techniques for generating the purified chitosan rather than the more expensive autoclaving, molecular sieves and/or ultrafiltration. Thus, chitosan purified according to the detailed methods should be considerably less expensive to produce compared to the presently available medical grade chitosan.

As described above, the more-contaminated chitosan starting material may be subjected to deproteinization and/or demetallization treatments. In other words, the deproteinization and demetallization process modules disclosed herein may be used in combination or individually for purifying chitosan. If reduced protein amounts, but not reduced metal amounts, are important for a specific use of the purified chitosan then deproteinization alone can be performed. Similarly, demetallization alone can be performed if the desired chitosan only requires reduced metal amounts.

The deproteinization and demetallization process modules can be performed in any sequence if both steps are desired. For example, a deproteinization agent may be mixed with a chitosan starting material. The resulting mixture may then be mixed with a demetallization agent. Alternatively, deproteinization and demetallization could be performed in reverse order. According to a further approach, the deproteinization agent and the demetallization agent can be pre-mixed together, and the resulting multi-agent mixture then is mixed with the chitosan starting material.

The deproteinization agent for mixing with the chitosan material may be any substance such as a protein-complexing agent that can remove at least a portion of the protein present in the chitosan material. The protein-complexing agent can also remove at least a portion of other impurities such as endotoxins, pigments, and protein conjugates such as glycoproteins. The deproteinization agent usually is mixed with the chitosan material under basic pH conditions to avoid the formation of a chitosan-deproteinization agent conjugate. In particular, the deproteinization agent is mixed with a liquid chitosan-containing composition that may be a solution, suspension or dispersion of the chitosan material in a liquid, typically water. The liquid chitosan-containing composition may be at basic pH prior to mixing with the deproteinization agent or it may be adjusted to basic pH after or during addition of the deproteinization agent. The basic pH of the mixture may range from about 7.0 to about 8.5, with a range of about 7.4 to about 8.0 in particular embodiments. The pH of the mixture may be controlled by the addition of a base such as an alkali hydroxide, ammonia, and soluble organic bases such as quaternary ammonium hydroxide. The deproteinization agent may be mixed with the chitosan material at room temperature and then heated to a temperature of about 40 to about 95° C. The amount of deproteinization agent mixed with the chitosan material can vary depending on the targeted amount of protein removal. In general, about 10 g of chitosan can be treated with about 1 g of deproteinization agent. The mixing time depends upon the mixing temperature. Elevated temperatures increase the normally slow rate of interaction of the deproteinization agent with protein so that at 95° C. a mixing time of five minutes is sufficient.

Mixing of the deproteinization agent with the chitosan material will result in the formation of a water insoluble chitosan precipitate or flocculent and a water soluble portion (i.e., a supernatant) that includes the deproteinization agent and any proteins that have complexed with the deproteinization agent. The water insoluble chitosan and water soluble supernatant may be separated by any known technique such as centrifugation, filtration or a combination thereof. Filtration, for example, can be performed with a filter material such as MIRACLOTH (commercially available from CalBiochem). Separation of the water insoluble chitosan and water soluble supernatant may be performed prior to any subsequent purification of the chitosan. Alternatively, subsequent purification of the chitosan may be performed using the mixture of the water insoluble chitosan and the water soluble supernatant.

Illustrative protein-complexing agents for use in the disclosed method include anionic detergents such as fatty alcohol sulfates, including sodium, potassium, ammonium or triethanolamine salts of saturated or unsaturated $C_{10}$ to $C_{18}$ hydrocarbons such as sodium dodecyl sulfate (SDS), sodium tetradecyl sulfate, sodium heptadecyl sulfate, and sodium lauryl sulfate (SLS); sodium 2-ethylhexyl sulfate; ethoxylated fatty alcohol sulfates, including alkyl ether sulfates such as sodium lauryl ether sulfate (SLES); sarconisate; alkyl glyceryl ether sulfonate; alpha sulpho fatty acids and esters; fatty acid esters of isethionic acid; acyl (fatty) N-methyltaurides; dialkylsulfo succinate esters, including $C_8$, $C_{10}$ and $C_{12}$ forms thereof; N-acylated amino acids, such as sodium N-lauroyl sarconisate or gluconate; and sodium coconut monoglyceride sulfonate.

The demetallization agent for mixing with the chitosan material may be any substance such as a metal-chelating or metal-complexing agent that can remove at least a portion of the metal present in the chitosan material. The demetallization agent usually is mixed with the chitosan material under basic pH conditions to avoid the formation of a chitosan-metal chelate conjugate. In particular, the demetallization agent is mixed with a liquid chitosan-containing composition that may be a solution, suspension or dispersion of the chitosan material in a liquid, typically water. The liquid chitosan-containing composition may be at basic pH prior to mixing with the demetallization agent or it may be adjusted to basic pH after or during addition of the demetallization agent. The basic pH of the mixture may range from about 7.0 to about 8.5, with a range of about 7.4 to about 8.0 in particular embodiments. The pH of the mixture may be controlled by the addition of a base such as an alkali hydroxide, ammonia, or water-soluble bases such as quaternary ammonium hydroxide. The demetallization agent may be mixed with the chitosan material at room temperature. The amount of demetallization agent mixed with the chitosan material can vary depending on the targeted amount of metal removal. In general, about 25 ml to about 35 ml demetallization agent (as a 5% w/v solution in water) may be mixed per 10 g chitosan material.

Mixing of the demetallization agent with the chitosan material will result in the formation of a water insoluble chitosan precipitate or flocculent and a water soluble portion (i.e., a supernatant) that includes the demetallization agent and any metals that have chelated or complexed with the demetallization agent. The water insoluble chitosan and water soluble supernatant may be separated by any known technique such as centrifugation, filtration or a combination thereof. Filtration, for example, can be performed with a filter material such as MIRACLOTH (commercially available from CalBiochem). Separation of the water insoluble chitosan and water soluble supernatant may be performed prior to any subsequent purification of the chitosan. Alternatively, subsequent purification of the chitosan may be performed using the mixture of the water insoluble chitosan and the water soluble supernatant.

Illustrative metal-chelating agents include the following organic acids and their isomers and salts: ethylenediaminetetraacetic acid (EDTA), nitrilotriacetic acid (NTA), diethylenetriaminepentaacetic acid (DTPA), ethyleneglycol-bis (2-amino-ethylether)N,N,N'N'-tetraacetic acid (EGTA), butylenediaminetetraacetic acid, (1,2-cyclohexylenedinitrilo-)tetraacetic acid (CyDTA), ethylenediaminetetrapropionic acid, (hydroxyethyl) ethylenediaminetriacetic acid (HEDTA), N,N,N',N'-ethylenediaminetetra(methylenephosphonic) acid (EDTMP), triethylenetetraminehexaacetic acid (TTHA), 1,3-diamino-2-hydroxypropane-N,N,N',N'-tetraacetic acid (DHPTA), methyliminodiacetic acid, propylenediaminetetraacetic acid, 1,5,9-triazacyclododecane-N,N', N"-tris (methylenephosphonic acid) (DOTRP), 1,4,7,10-tetraazacyclododecane-N,N',N",N'"-tetrakis(methylenephosphonic acid) (DOTP), nitrilotris(methylene) triphosphonic acid, diethylenetriaminepenta(methylenephosphonic acid) (DETAP), aminotri(methylenephosphonic acid), 1-hydroxyethylene-1,1-diphosphonic acid, bis (hexamethylene)triamine phosphonic acid, 1,4,7-triazacyclononane-N,N',N"-tris(methylenephosphonic acid (NOTP), 2-phosphonobutane-1,2,4-tri-carboxylic acid, citric acid, tartaric acid, gluconic acid, saccharic acid, glyceric acid, oxalic acid, phthalic acid, maleic acid, mandelic acid, malonic acid, lactic acid, salicylic acid, 5-sulfosalicylic acid, catechol, gallic acid, propyl gallate, pyrogallol, 8-hydroxyquinoline, and cysteine.

Removing insoluble particles, such as residual chitin, protein, polysaccharides, and polysaccharide conjugates, from the chitosan starting material is an optional initial step. This step can be accomplished by adding a sufficient amount of a dilute aqueous acid to the chitosan starting material to solubilize the chitosan. The pH of the resulting solution should be about 2.4 to about 4.0. Illustrative solubilizing agents for solubilizing chitosan include organic acids having 1 to 10 carbon atoms, particularly 2 to 7 carbon atoms, such as formic acid, acetic acid, butyric acid, glutamic acid, tartaric acid, succinic acid, lactic acid, ascorbic acid, propionic acid, and adipic acid, and mineral acids such as hydrochloric acid. Acetic acid, glutamic acid, tartaric acid, ascorbic acid and lactic acid are especially suitable. It has been found that in certain instances utilization of an initial solubilization coupled with deproteinization may result in a purified chitosan with a lower amount of residual protein compared to using deproteinization without an initial solubilization step.

A further optional purification treatment agent is a reducing agent for enhancing the water solubilization of protein impurities by dissociating any disulfide bonds present in the protein. The reducing agent is particularly useful if it is added to the chitosan material in conjunction with the deproteinization agent. The amount of reducing agent mixed with the chitosan material is not critical and may range, for example, from about 1 mM to about 5 mM, depending on the level of protein contamination. Examples of suitable reducing agents include sulfhydryl reducing agents such as, for example, dithiothreitol (DTT), dithioerythritol (DTE) and mercaptoethanol.

Deproteinization alone of chitosan according to the disclosed methods can reduce the protein content to less than about 0.2 weight percent, more particularly less than about 0.1 weight percent. Demetallization alone of chitosan according to the disclosed methods can reduce the metal (especially heavy metal) content to less than about 5 ppm, more particularly less than about 3.5 ppm. Deproteinization and demetallization combined according to the disclosed methods can reduce the protein content to less than about 0.2 weight percent, more particularly less than about 0.1 weight percent, the metal (especially heavy metal) content to less than about 5 ppm, more particularly less than about 3.2 ppm, and the ash content to less than about 0.1 weight percent, more particularly less than about 0.01 weight percent. Deproteinization, demetallization, and sulfur solubilization combined according to the disclosed methods can reduce the protein content to less than about 0.1 weight percent, the metal (especially heavy metal) content to less than about 3.2 ppm, more particularly to undetectable levels, and the ash content to less than about 0.1 weight percent, more particularly less than about 0.01 weight percent.

The purified chitosan made by the methods disclosed herein is useful in numerous pharmaceutical, medical device, food and water treatment applications. The purified, biocompatible chitosan may be used as a delivery vehicle for a therapeutically active agent, in a synthetic bone graft material (e.g., a mixture of chitosan and hydroxyapatite), in spinal fusions, and in various wound healing applications such as hemostatic bandages or sponges. For example, U.S. Pat. Nos. 5,836,970; 5,420,197; 5,395,305; 4,956,350; 4,699,135; 4,659,700; 4,651,725; 4,614,794; 4,572,906; 4,570,629; 4,532,134; 4,394,373; 3,903,268; 3,632,754; and 6,056,970 describe various wound dressings, hemostatic sponges or hemostatic bandages made from chitosan. The purified chitosan may also be used for repair and regeneration of cartilage and other tissues as described, for example, in U.S. Published patent application No. 20020082220. The purified chitosan may be used in various physical forms such as fibers, films, gels or powders. For example, chitosan fibers may be made using wet spinning techniques as described in U.S. Pat. Nos. 5,897,821 and 5,836,970. The purified chitosan may also be used to make chitosan derivatives such as chitosan lipoate, chitosan poly(ethylene glycol), chitosan oligosaccharide lactate, chitosan neutralized with pyrrolidone carboxylic acid, carboxymethyl sodium salt of chitosan, chitosan neutralized with glutamic acid, and N,O-carboxymethyl chitosan.

The specific examples described below are for illustrative purposes only and should not be considered as limiting the scope of the appended claims.

EXAMPLE 1

Removing Insoluble Particles

Food grade chitosan powder (30 g, a product of Genis ehf, Iceland) was dissolved in 1% acetic acid (3 L) by shaking the suspension overnight at 40° C. Insoluble particles were removed from the resulting aqueous solution by centrifugation at 10,000 g, 40° C. for 1 hour. In order to quantify the insoluble material, the pellet was washed by deionized water and lyophilized to produce an insoluble powder that was weighed (~450 mg; ~1.5%). The amount of ash, protein, heavy metal and calcium in the Genis ehf food grade chitosan powder is shown below in Table 1.

Deproteinization and Decolorization

The supernatant (~3 L) from the above-described centrifugation was titrated by dropwise addition of 0.5M NaOH with stirring, until the pH of the suspension reached 8.0. A white flocculent precipitate started to form as the pH of the mixture exceeded 6.0. Sodium dodecyl sulfate (SDS) (30 ml of a 10% w/v aqueous solution) was added into the mixture, which was heated to 90–95° C. and stirred for 5 minutes. The resulting mixture was cooled down to room temperature and another few drops of 0.5M NaOH was added to make the pH of the mixture approximately 10.

The water insoluble chitosan precipitate was harvested by centrifugation (5000 g, room temperature for 30 min.), and washed exhaustively by deionized water (40–45° C.) until the washing supernatant exhibited a negative reaction for sulfate ions indicating the complete removal of SDS. The sulfate ion test involved adding 10% w/v solution of barium chloride in 0.1% v/v hydrochloric acid to an equal volume of the sample. The solution turns milky white if sulfate ions are present. Lyophilization of the pellet produced 27.2 g dried chitosan powder (yield ~90%). The amount of ash, protein, heavy metal and calcium in the resulting purified chitosan powder is shown below in Table 1.

Although SDS was added at a pH of 8.0 to avoid the formation of a chitosan dodecyl sulfate conjugate, a lower pH (within about 7.0–8.5) can also be used with similar results. The pH should be equilibrated for a longer period of time if the pH is closer to 7.0. The SDS treatment can also be performed at a lower temperature (e.g., about 80–95° C.) for different time periods (e.g., about 5–10 minutes) with similar results. The resulting protein content may be higher if the SDS treatment is performed at a temperature below 60° C. Different concentrations of chitosan (0.5–2.0% w/v) and sodium hydroxide (0.5–5M) have been used in this purification also with similar results.

EXAMPLE 2

The removal of insoluble particles and deproteinization of chitosan powder was performed using the same procedure as described above in Example 1.

Demetallization

An ethylenediaminetetraacetic acid (EDTA) aqueous solution (100 ml, 5% w/v) was added into the mixture of water insoluble chitosan and SDS-containing solution obtained as in Example 1 and stirred at room temperature for 2 hours. The pellet was collected by centrifugation (5000 g, room temperature for 30 min.) and washed by deionized water (40° C.) exhaustively until the washing supernatant exhibited a negative response to the sulfate ion test. In addition, burning the sample in a gas flame (sodium ion flame test) did not turn the flame yellow, thus indicating the absence of sodium and therefore EDTA. The pellet was freeze-dried to produce 27.1 g of purified chitosan representing a 90% yield. The amount of ash, protein, heavy metal and calcium in the resulting purified chitosan powder is shown below in Table 1.

EXAMPLE 3

Solubilizing Protein in the Presence of Reduction Agents

The procedure in Example 1 was repeated except that the SDS treatment is combined with the addition of mercaptoethanol (MER) (or dithiothretol DTT). The mercaptoethanol (5 mM) was added to the mixture of water insoluble chitosan and SDS-containing solution. The mixture was heated to 90–95° C. for 5 minutes while stirring, and then it was cooled to room temperature. An aqueous EDTA solution (5% w/v) was added to the mixture and stirred at room temperature for two hours. The water insoluble chitosan precipitate was collected by centrifugation (5000 g, RT for 30 min.) and washed exhaustively by deionized water until the washing supernatant exhibited a negative reaction for sulfate ions indicating the complete removal of SDS, and a negative flame test demonstrating the absence of sodium ions and therefore EDTA. The amount of ash, protein, heavy metal and calcium in the resulting purified chitosan powder is shown below in Table 1. The same results were obtained when SDS, EDTA and mercaptoethanol were pre-mixed before adding to the food grade chitosan.

TABLE 1

|  | Genis ehf untreated | SDS treated | SDS + EDTA treated | SDS + EDTA + MER treated | ULTRASAN[1] |
|---|---|---|---|---|---|
| Ash content (w/w %) | 0.31 | 0.14 | 0.01 | n.d.[2] | ≤0.2 |
| Protein content (w/w %) | 0.4–0.8 | 0.1 | <0.1 | <0.1 | ≤0.2 |
| Endotoxin (EU/mg) | 0.01–0.5 | n.d. | n.d. | n.d. | ≤0.5 |
| Heavy metal (ppm) | trace | n.d. | n.d. | n.d. | ≤5 |
| Ca (ppm) | 72.5 | 30 | 5 | 5 | n.d. |

The protein assay was done by Coomassie Plus Assay Reagent Kit (commercially available from Pierce, Rockford, IL) using bovine serum albumin as a standard.
[1]ULTRASAN is a medical grade chitosan commercially available from Biosynech Inc., Canada
[2]Not detected

EXAMPLE 4

Direct Deproteinization of Insoluble Chitosan

Food grade chitosan powder (10 g, a product of Genis ehf, Iceland) was suspended in deionized water (2 L) at room temperature. The pH of the supernatant of the swollen suspension was 7.8. A SDS solution (10 ml of a 10% w/v in water) was added to the suspended chitosan and stirred vigorously at room temperature for 2 hours. The mixture then was heated at 90–95° C. for 5 minutes and then cooled down to room temperature.

Demineralization

Demetallization was performed as described in Example 2. Lyophilization of the pellet produced 9.1 g of purified chitosan corresponding to a yield of 91%. However, this product contained a higher protein content (approx. 0.25%) compared to the product produced using acetic acid solubilization prior to addition of the SDS and EDTA (approx. 0.1%). This result indicates that employing the acid-base titration to precipitate the chitosan as a fine flocculent precipitate is useful for reducing the amount of protein contaminants to an acceptable level.

What is claimed is:

1. A method for purifying a food grade chitosan material that includes at least one pre-existing impurity selected from protein or metal, the method comprising:
   contacting the food grade chitosan material with at least one treatment agent selected from a protein-complexing agent, and a metal-chelating or complexing agent under pH conditions effective for forming a water insoluble chitosan precipitate and at least one water soluble material selected from a water soluble protein complex, and a water soluble metal chelate, or complex; and separating the water insoluble chitosan precipitate from the water soluble material resulting in a purified chitosan material that includes a lower amount of at least the protein or metal impurity, relative to the food grade chitosan material.

2. The method of claim 1, wherein the food grade chitosan material has at least one pre-existing impurity selected from protein in an amount of less than about 1.2 weight percent, metal in an amount of about 70 to about 80 ppm and heavy metal in an amount of less than about 7.5 ppm.

3. The method of claim 1, wherein the protein-complexing agent comprises an anionic detergent.

4. The method of claim 3, wherein the anionic detergent comprises a fatty alcohol sulfate.

5. The method of claim 1, wherein the metal-chelating agent comprises an organic acid or a salt of an organic acid.

6. The method of claim 5, wherein the organic acid is selected from ethylenediaminetetraacetic acid, nitrilotriacetic acid, diethylenetriaminepentaacetic acid, and ethyleneglycol-bis(2-amino-ethylether)N,N,N'N'-tetraacetic acid.

7. The method of claim 1, wherein the food grade chitosan material is contacted with a protein-complexing agent and a metal-chelating agent.

8. The method of claim 7, wherein the contacting of the food grade chitosan material with the protein-complexing agent and the metal-chelating agent both occur under basic pH conditions.

9. The method of claim 1, wherein the contacting of the food grade chitosan material with the treatment agent occurs under basic pH conditions.

10. The method of claim 1, further comprising contacting the food grade chitosan with a sulfhydryl reducing agent.

11. The method of claim 1, wherein the amount of protein in the purified chitosan material is less than about 0.1 weight percent or the amount of metal in the purified chitosan material is less than about 5 ppm.

12. The method of claim 11, wherein the amount of heavy metal in the purified chitosan material is less than about 5 ppm.

13. The method of claim 1, further comprising forming the purified chitosan material into a hemostatic article.

14. A method for purifying chitosan powder that includes at least one pre-existing impurity, the method comprising:
    contacting the chitosan powder with at least one treatment agent selected from a protein-complexing agent, and a metal-chelating or complexing agent under pH conditions effective for forming a water insoluble chitosan precipitate and at least one water soluble material that includes the pre-existing impurity; and
    separating the water insoluble chitosan precipitate from the water soluble material resulting in a purified chitosan material that includes a lower amount of the impurity relative to the chitosan powder.

15. The method of claim 14, wherein the protein-complexing agent comprises an anionic detergent.

16. The method of claim 15, wherein the anionic detergent comprises a fatty alcohol sulfate.

17. The method of claim 14, wherein the metal-chelating agent comprises an organic acid or a salt of an organic acid.

18. The method of claim 17, wherein the organic acid is selected from ethylenediaminetctraacetic acid, nitrilotriacetic acid, diethylenetriaminepentaacetic acid, and ethyleneglycol-bis(2-amino-ethylether)N,N,N'N'-tetraacetic acid.

19. The method of claim 14, wherein the chitosan powder is contacted with a protein-complexing agent and a metal-chelating agent.

20. The method of claim 14, wherein the contacting of the chitosan powder with the treatment agent occurs under basic pH conditions.

21. The method of claim 14, further comprising contacting the chitosan powder with a sulfhydryl reducing agent.

22. The method of claim 14, further comprising forming the purified chitosan material into a hemostatic article.

23. A method for purifying a chitosan starting material that includes at least one pre-existing impurity, the method comprising:
    solubilizing the chitosan starting material in an aqueous solution to produce an intermediate chitosan material;
    contacting the intermediate chitosan material with at least one treatment agent selected from a deproteinization agent and a demetallization agent under pH conditions effective for forming a water insoluble chitosan precipitate and at least one water soluble material that includes the pre-existing impurity; and
    separating the water insoluble chitosan precipitate from the water soluble material resulting in a purified chitosan material that includes a lower amount of the pre-existing impurity relative to the chitosan starting material.

24. The method of claim 23, further comprising contacting the intermediate chitosan material with a sulfhydryl reducing agent simultaneously with the deproteinization agent.

25. The method of claim 23, wherein the intermediate chitosan material is contacted with the deproteimzation agent and the demetallization agent under basic pH conditions.

26. The method of claim 25, wherein the solubilizing of the chitosan starting material comprises mixing the chitosan starting material with an acidic aqueous solution.

27. The method of claim 26, wherein the intermediate chitosan material is contacted with the deproteinization agent and the demetallization agent under basic pH conditions, and the solubilizing of the chitosan starting material comprises mixing the chitosan starting material with an acidic aqueous solution.

28. The method of claim 27, wherein the contacting of the intermediate chitosan material with the deproteinization agent comprises mixing the deproteinization agent with the intermediate chitosan material and heating the resulting mixture.

29. The method of claim 28, wherein the deproteinization agent comprises an anionic detergent and the demetallization agent comprises an organic acid or a salt of an organic acid.

30. The method of claim 23, wherein the contacting of the intermediate chitosan material with the deproteinization agent comprises mixing the deproteinization agent with the intermediate chitosan material and heating the resulting mixture.

31. The method of claim 23, further comprising forming the purified chitosan material into a hemostatic article.

32. A method for purifying a chitosan starting material that includes at least one pre-existing impurity, the method comprising:
    contacting the chitosan starting material with at least one treatment agent selected from a protein-complexing agent, and a metal-chelating or complexing agent under pH conditions effective for forming a water insoluble chitosan precipitate and at least one water soluble material that includes the pre-existing impurity;
    contacting the chitosan starting material with a sulfhydryl reducing agent; and
    separating the water insoluble chitosan precipitate from the water soluble material resulting in a purified chitosan material that includes a lower amount of the impurity relative to the chitosan starting material.

33. A method for purifying a chitosan starting material that includes at least one pre-existing impurity, the method comprising:

solubilizing the chitosan starting material in an aqueous solution to produce an intermediate chitosan material;

contacting the intermediate chitosan material with at least one treatment agent selected from a deproteinization agent and a demetallization agent under pH conditions effective for forming a water insoluble chitosan precipitate and at least one water soluble material that includes the pre-existing impurity, wherein contacting the intermediate chitosan material with the deproteinization agent comprises mixing the deproteinization agent with the intermediate chitosan material and heating the resulting mixture; and separating the water insoluble chitosan precipitate from the water soluble material resulting in a purified chitosan material that includes a lower amount of the pre-existing impurity relative to the chitosan starting material.

* * * * *

UNITED STATES PATENT AND TRADEMARK OFFICE
CERTIFICATE OF CORRECTION

| | |
|---|---|
| PATENT NO. | : 6,896,809 B2 |
| APPLICATION NO. | : 10/326462 |
| DATED | : May 24, 2005 |
| INVENTOR(S) | : Qian et al. |

It is certified that error appears in the above-identified patent and that said Letters Patent is hereby corrected as shown below:

On the title page, under Item (56) "Other Publications,"

"http:iftconfex.com/ift/2002/techprogram/paper_13867" should read

--http:ift.confex.com/ift/2002/techprogram/paper_13867--.

<u>In the Specification:</u>

Column 8, line 66, "chelate, or" should read --chelate or--.

Signed and Sealed this

Sixth Day of March, 2007

JON W. DUDAS
*Director of the United States Patent and Trademark Office*